United States Patent

[11] 3,622,688

| [72] | Inventors | Edwin A. Link<br>Waukesha;<br>Edward L. Sankey, New Berlin, both of Wis. |
|---|---|---|
| [21] | Appl. No. | 881,504 |
| [22] | Filed | Dec. 2, 1969 |
| [45] | Patented | Nov. 23, 1971 |
| [73] | Assignee | RTE Corporation<br>Waukesha, Wis. |

[54] CABLE LEAD BUSHING
6 Claims, 2 Drawing Figs.

[52] U.S. Cl. ............................................... 174/142,
174/73 R, 174/152 R, 339/61 R, 339/126 RS, 339/143 C
[51] Int. Cl. ...................................................... H01b 17/26
[50] Field of Search............................................ 174/18, 65
G, 73, 75, 75 D, 142, 143, 152, 152.2, 153, 153 G,
151; 339/126, 143, 59 R, 59 M, 60 R, 60 C, 60 M,
61 R, 61 M, 94 R, 94 A, 94 C, 94 M, 125 R;
29/631

[56] References Cited
UNITED STATES PATENTS

| 3,328,744 | 6/1967 | Fiske............................ | 339/61 R |
| 2,813,922 | 11/1957 | Arnold......................... | 174/77 X |
| 2,987,570 | 6/1961 | Bluth............................ | 174/151 X |
| 3,243,756 | 3/1966 | Ruete et al.................... | 174/73 X |

FOREIGN PATENTS

| 1,117,689 | 11/1961 | Germany...................... | 174/65 (G) |
| 1,048,044 | 11/1966 | Great Britain................. | 174/18 |

*Primary Examiner*—Laramie E. Askin
*Attorneys*—Ronald E. Barry and James E. Nilles

ABSTRACT: A composite bushing for terminating a high-voltage cable which has an electrical conductor, cable insulation and a semiconductive shield. The bushing including an electrically conductive assembly adapted to be electrically connected to the conductor. A sleeve of electrically insulating elastomeric material surrounding the assembly in a spaced relation thereto and extending outwardly from one end thereof, said outwardly extending portion having a passage adapted to sealingly engage the exposed cable insulation. A rigid dielectric housing bonded to the portion of the length of said sleeve around said assembly and to a portion of said assembly, an inner sleeve of electrically conductive elastomeric material provided within said nonconductive elastomeric sleeve and having a length sufficient to bridge the space between the assembly and the nonconductive sleeve. The electrically conductive sleeve having a reduced diameter section at each end to engage the assembly at one end and the cable insulation at the other end.

PATENTED NOV 23 1971
3,622,688
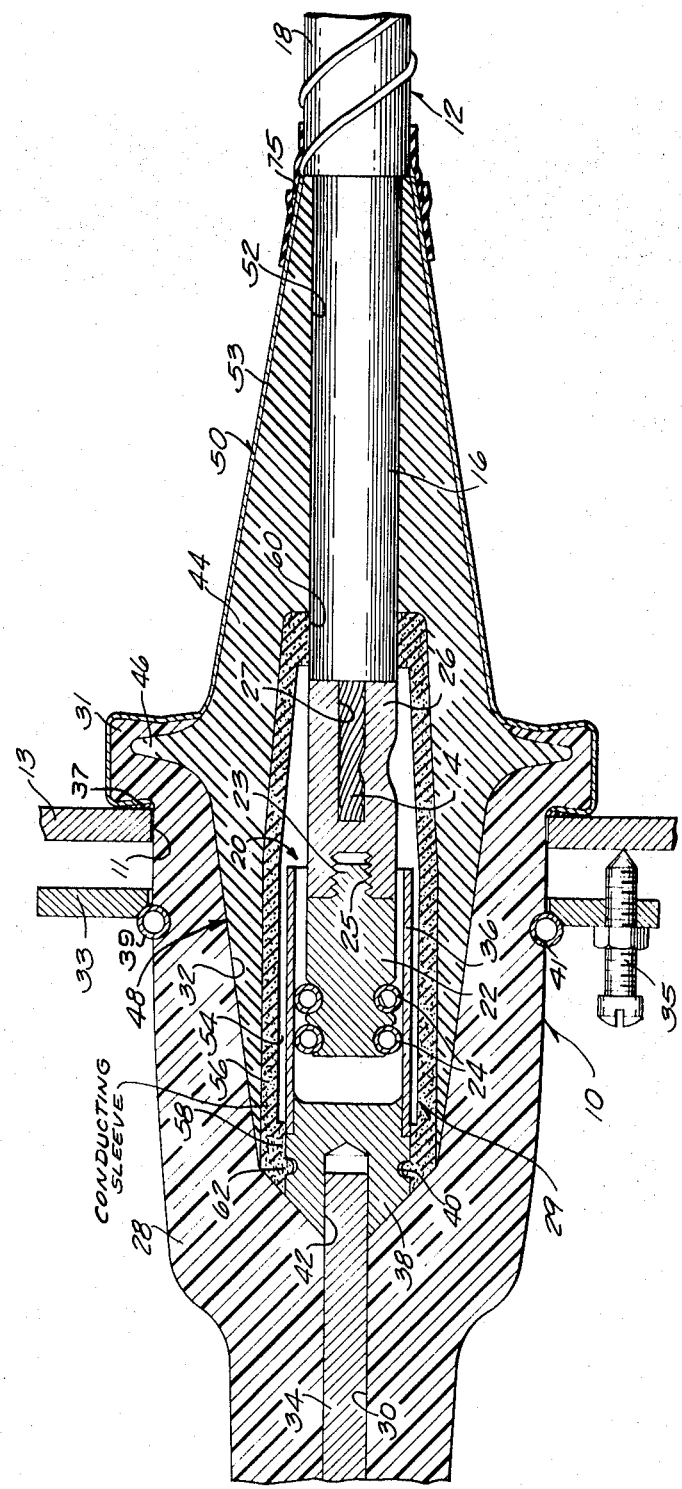
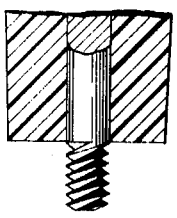
Inventors
Edwin A. Link
Edward J. Sankey
By
Ronald E. Barry
Attorney

//3,622,688

CABLE LEAD BUSHING

BACKGROUND OF THE INVENTION

Cable lead bushings for terminating high-voltage cables generally include a rigid insulating housing formed of a solid dielectric and an elastomeric insulating sleeve having a portion of its length bonded to one end of said housing and extending outwardly therefrom in the form of a stress cone to sealingly engage the cable insulation. The electrical integrity of the bushing depends to a large extent on the bond between the housing and the sleeve. When cable termination is completed, the sleeve is usually confined in the space between the rigid housing and the electrically conductive assembly used to complete cable termination within the housing. The solid dielectric housing and the elastomeric insulating sleeve have different coefficients of expansion, and when subjected to changes in temperature at the termination will stress and often destroy the bond between the sleeve and the housing.

SMMARY OF THE INVENTION

The composite bushing of the present invention is provided with a cavity or space within the bushing to allow for expansion and contraction of the elastomeric sleeve. The electrically nonconductive elastomeric sleeve of the bushing is provided with an increased diameter portion that bridges the cable termination. Corona within the air space is eliminated by providing an electrically conductive surface in the air space to maintain an equal potential across the termination.

Other objects and advantages of the present invention will appear hereinafter as this disclosure progresses, reference being had to the accompanying drawings, in which FIG. 1 is a sectional view of the cable lead bushing shown mounted on a barrier; and FIG. 2 is a sectional view of an alternate embodiment of the invention wherein the insulator is spaced from a barrier.

DESCRIPTION OF THE PREFERRED EMBODIMENT

The composite bushing 10 disclosed herein used to terminate a high-voltage cable 12 which generally includes a conductor 14 enclosed within a cable insulation 16 and a semiconductive shield 18. The bushing 10 is also used to seal the opening 11 provided in a solid barrier 13 such as a transformer wall. The high-voltage cable 12 is prepared for termination by stripping the semiconductive shield 18 from the cable insulation 16 to expose a portion of the cable insulation 16. A portion of the cable insulation 16 is also cut away to expose a portion of the conductor 14. A cable connector assembly 20 is secured to the exposed conductor 14 and includes an electrically conductive male member 22 having a pair of conductive springs 24 wound around its outer surface and a threaded extension 23 at one end. A conductive support 26 having a small threaded bore 25 and a passage or bore 27 is mounted on the exposed conductor 14 by inserting the conductor 14 into the passage 27. The support 26 is then crimped or welded to the conductor 14. The threaded extension 23 is screwed into the small bore 25 in the support 26.

In accordance with the invention, the composite bushing 10 which is used to terminate the cable 12, includes an electrically conductive assembly 29 supported by a rigid dielectric housing 28. The housing 28 is molded from an epoxy type dielectric material and includes a passage 30, a radial mounting flange 31, and a conical opening 32. The housing is placed in the opening 11 in the solid barrier 13 with the flange 31 abutting the barrier 13. The housing is retained in the opening 11 in the barrier by means of a retaining ring 33 mounted on the housing 28 and a number of retainer screws 35 which are tightened against the barrier 13. The retainer ring 33 is prevented from sliding off of the housing 28 by means of a stop spring 39 seated in groove 41 in the outer surface of the housing. A gasket 37 is provided between the flange 31 and the barrier 13.

The electrically conductive assembly 29 includes an electrically conductive stud 34 embedded in the passage 30 and projecting partially into the conical opening 32. Means are provided on the stud 34 for electrically engaging the connector assembly 20 in the form of an electrically conductive tubular or cylindrical female member 36. The member 36 is open at one end to receive the connector assembly 20 and is closed at the other end by a conductive support 38 which has an annular recess 40 and a bore 42 to receive the stud 34. It should be noted that although the members 22 and 36 are shown connected to the conductor 14 and housing 28, they can be reversed.

The dielectric strength of the termination is maintained by means of an electrically insulating sleeve or member 44 which is formed from an elastomeric material such as a clay filled ethylene propylene terpolymer and tapers inwardly in both directions from a radially extending flange 46. One portion 48 of the sleeve 44 is bonded to the conical opening 32 in the housing 28. The other portion 50 of the sleeve 44 is shaped to form a stress cone and has a passage 52 having a diameter substantially equal to the outer diameter of the cable insulation 16. On insertion of the cable 12 into the passage 52, the sleeve will firmly grip the cable insulation 16 and thereby seal the connection and increase the dielectric strength of the creep path along the cable insulation 16. An electrically conductive paint 53 is applied to the outer surface of the flange 31 on the housing 28 and to the exposed portion 50 of the sleeve 44.

Means are provided for allowing the resilient sleeve 44 to expand within the opening 32 in the housing in the form of an air space 54 provided between the tubular member 36 and assembly 20 and the outer sleeve 44. The space 54 is formed by means of an inner elastomeric conductive sleeve 56 molded within the outer sleeve 44. The inner sleeve 56 has an inner portion having a diameter greater than the outer diameter of the tubular member 36 and a length sufficient to bridge the entire length of the termination. The diameter of the sections 58 and 60 provided at each end of the member 56 are made large enough to tightly engage the conductive support 38 and the outer surface of the cable insulation 16. The member 36 is located in the sleeve 56 by means of a rib 62 in section 58 which engages groove 40.

Although an inner sleeve is shown, the space 54 can also be formed by providing an increased diameter section in the sleeve 44 and coating the inner surface with a conductive paint.

Cable termination is achieved by inserting the electrically conductive assembly 20 into electrical engagement with the tubular member 36 through the opening 52. The space 54 in the inner sleeve 56 between the sections 58 and 60 is located within the bond between the housing 28 and the sleeve 44 to allow the outer sleeve to expand and contract without producing any stress on the bond between the outer sleeve 44 and the housing 28.

Corona within the space 54 is prevented by forming the inner sleeve 56 of an electrically conducting elastomeric material such as an ethylene propylene terpolymer combined with carbon as is generally understood in the art. An equal electrical potential will then exist across the electrical termination.

The cable lead bushing 10 is formed by initially molding the electrically conductive sleeve 56 on a mandrel. The outer sleeve 44 is then molded around the sleeve 56 to form a void-free bond between the inner sleeve 56 and the outer sleeve 44. A radially extending flange 46 is provided around the center portion of the member 44. The portion 48 completely surrounds the sleeve 56 and tapers toward the end of the inner sleeve 56. The portion 50 tapers to the end of passage 52 and forms a stress cone.

The electrically conductive assembly 29 is formed by securing the conductive tube 36 to the connecting means 38. The stud 34 is inserted into the opening 42 in the member 38 and is retained therein by soldering or crimping the member 38 to the stud. The electrically conductive assembly 29 is then inserted into the electrically conductive sleeve 56 until the rib 60 seats in the annular groove 40 in the member 38. The inner and outer sleeves 44 and 56 and the electrically conductive assembly are then held on a mandrel and a primer such as Michigan Chrome AC 1445(IBM-02095) is applied to the stud 34 and to a portion of the length of the sleeve 44. The solid dielectric housing 28 is molded around a portion of the length of the sleeve 44 and the stud 34 to form the composite bushing and the primer assures a good bond between the housing 28 and the sleeve 44.

Cable termination is made by inserting the cable connector 20 into the conductive member 36 through the passage 52 in sleeve 44. An electrically conductive tape 75 is wrapped around the end of the sleeve 44 and the semiconductive shield 18 to complete the electrical circuit across the outer surface of the bushing.

What is claimed is:

1. A cable lead bushing for terminating a high-voltage cable having an electrical conductor and a cable insulation, a portion of the cable insulation and the conductor being exposed, said bushing comprising:
   a rigid housing having an opening at one end,
   means supported within said housing for electrically engaging the conductor,
   a resilient insulating member bonded to said housing and having a passage adapted to sealingly engage the cable insulation, a portion of said resilient insulating member surrounding said electrical engaging means and being spaced therefrom and
   an inner sleeve of elastomeric electrically conductive material molded to said portion of said insulating member and having a length sufficient to bridge said electrical engaging means.

2. A cable lead bushing according to claim 1 wherein said inner sleeve includes a reduced diameter section at each end, one of said sections engaging said electrical engaging means, the other of said sections being adapted to engage the cable insulation to form a cavity therebetween.

3. A bushing for terminating a high-voltage cable having an exposed electrical conductor and a cable insulation, said bushing comprising
   an inner electrically conductive elastomeric sleeve,
   an outer electrically insulating elastomeric sleeve molded around said inner sleeve and extending beyond one end of said inner sleeve and having a passage therein for receiving the conductor,
   a solid dielectric housing bonded to a portion of the length of said outer sleeve and extending beyond the other end of said inner sleeve and,
   an electrically conductive assembly adapted to be connected to the electrical conductor and supported by said housing in a spaced relation to a portion of said inner sleeve.

4. A bushing according to claim 3 including means for locating said conductive assembly within said inner sleeve.

5. A bushing according to claim 4 wherein said locating means includes a rib in said inner sleeve and
   a groove in said assembly.

6. A bushing according to claim 3 wherein said passage has substantially the same diameter as said cable insulation to form a seal-on connection.

* * * * *